(12) United States Patent
Lahetkangas et al.

(10) Patent No.: US 9,628,252 B2
(45) Date of Patent: Apr. 18, 2017

(54) SIGNALING IN TDD COMMUNICATION (71) Applicant: NOKIA SOLUTIONS AND NETWORKS OY, Espoo (FI)

(72) Inventors: Eeva Lahetkangas, Oulu (FI); Esa Tapani Tiirola, Kempele (FI)

(73) Assignee: Nokia Solutions and Networks OY, Espoo (FI)

( * ) Notice: Subject to any disclaimer, the term of this patent is extended or adjusted under 35 U.S.C. 154(b) by 95 days.

(21) Appl. No.: 14/427,923

(22) PCT Filed: Sep. 19, 2012

(86) PCT No.: PCT/EP2012/068400
§ 371 (c)(1),
(2) Date: Mar. 12, 2015

(87) PCT Pub. No.: WO2014/056517
PCT Pub. Date: Apr. 17, 2014

(65) Prior Publication Data
US 2015/0256319 A1  Sep. 10, 2015

(51) Int. Cl.
*H04J 3/00* (2006.01)
*H04L 5/14* (2006.01)
*H04B 7/26* (2006.01)
*H04L 5/00* (2006.01)

(52) U.S. Cl.
CPC ............ *H04L 5/14* (2013.01); *H04B 7/2656* (2013.01); *H04L 5/0048* (2013.01)

(58) Field of Classification Search
None
See application file for complete search history.

(56) References Cited

U.S. PATENT DOCUMENTS

| 7,336,930 | B2  |  2/2008 | Larsson et al. |          |
|-----------|-----|---------|----------------|----------|
| 8,483,103 | B2* |  7/2013 | Suo            | H04W 56/002 |
|           |     |         |                | 370/275  |
| 8,542,772 | B2* |  9/2013 | Zeira          | H04B 1/7105 |
|           |     |         |                | 327/310  |
| 8,611,461 | B2* | 12/2013 | Ding           | H04L 1/0025 |
|           |     |         |                | 375/298  |

(Continued)

FOREIGN PATENT DOCUMENTS

| KR | 10-2011-0044892 A |  5/2011 |
|----|-------------------|---------|
| WO | 2013/149651 A1    | 10/2013 |

OTHER PUBLICATIONS

Japanese Office Action with English translation for Japanese Application No. 2015-532307, mailed Apr. 18, 2016, 8 pages.

(Continued)

*Primary Examiner* — Phirin Sam
(74) *Attorney, Agent, or Firm* — Brake Hughes Bellermann LLP (57) ABSTRACT

There is provided a method, comprising: applying, by a first node operating under a time division duplex communication scheme, a frame structure comprising an extended transmission part, wherein the extended transmission part at least partially overlaps in time domain with a reception part of a frame structure applied by at least one second node operating at least partially under the same transmission/reception pattern as the first node; and causing specific signaling to the at least one second node in the extended transmission part.

18 Claims, 7 Drawing Sheets

---

300 APPLYING, BY A FIRST NODE, A FRAME STRUCTURE COMPRISING AN EXTENDED TRANSMISSION PART, WHEREIN THE EXTENDED TRANSMISSION PART AT LEAST PARTIALLY OVERLAPS IN TIME DOMAIN WITH A RECEPTION PART OF A FRAME STRUCTURE APPLIED BY LEAST ONE SECOND NODE OPERATING AT LEAST PARTIALLY UNDER THE SAME TRANSMISSION/RECEPTION PATTERN AS THE FIRST NODE

302 CAUSING SPECIFIC SIGNALING TO THE AT LEAST ONE SECOND NODE IN THE EXTENDED TRANSMISSION PART (56) References Cited

U.S. PATENT DOCUMENTS

| | | | | |
|---|---|---|---|---|
| 9,197,376 | B2* | 11/2015 | Verma | H04L 1/1812 |
| 2009/0092066 | A1* | 4/2009 | Chindapol | H04W 76/005 |
| | | | | 370/277 |
| 2009/0219840 | A1* | 9/2009 | Barriac | H04W 52/146 |
| | | | | 370/281 |
| 2011/0149894 | A1* | 6/2011 | Luo | H04W 16/02 |
| | | | | 370/329 |
| 2011/0188398 | A1* | 8/2011 | Baba | H04B 7/15542 |
| | | | | 370/252 |
| 2011/0268016 | A1 | 11/2011 | Youn et al. | |
| 2012/0027110 | A1* | 2/2012 | Han | H04J 11/0079 |
| | | | | 375/260 |
| 2012/0314752 | A1* | 12/2012 | Zeira | H04B 1/7105 |
| | | | | 375/229 |

OTHER PUBLICATIONS

"DL and UL Backhaul Subframe Allocation for Type I Relay in LTE-A", R1-091989, CATT, CMCC, Potevio, 3GPP TSG RAN WG1 #57, San Francisco, USA, May 4-8, 2009, 3 pages.

"Information exchange over a wireless X2 interface between relay nodes", R2-092827, Sharp, 3GPP TSG RAN WG2 Meeting #66, San Francisco, USA, May 4-8, 2009, 3 pages.

English translation of Korean Office Action for Korean Application No. 10-2015-7009763, mailed Dec. 16, 2015, 4 pages.

International Search Report and Written Opinion for International Application No. PCT/EP2012/068400, mailed Jul. 3, 2013, 12 pages.

"2020: Beyond 4G Radio Evolution for the Gigabit Experience", Beyond 4G White Paper, NSN Research (editors: Harri Holma and Peter Merz), 2011.

R2-092827; 3GPP TSG RAN WG2 Meeting #66; San Francisco, USA, May 4-8, 2009; Source: Sharp Title: Information exchange over a wireless X2 interface between relay nodes; p. 1-3 fig. 1.

R1-091989; 3GPP TSG RAN WG1 #57; San Francisco, USA, May 4-8, 2009; Source: GATT, CMCC, Potevio Title: DL and UL Backhaul Subframe Allocation for Type I Relay in LTE-A; p. 1, paragraph 1—p. 3; figures 1-6.

Gabor Fodor; Design Aspects of Network Assisted Device-to-Device Communications; IEEE Communications Magazin; vo. 50, 3 Mar. 1, 2012 pp. 170-177 ISSn 0163-6804 p. 1-5 fig. 1-4.

* cited by examiner

300 APPLYING, BY A FIRST NODE, A FRAME STRUCTURE COMPRISING AN EXTENDED TRANSMISSION PART, WHEREIN THE EXTENDED TRANSMISSION PART AT LEAST PARTIALLY OVERLAPS IN TIME DOMAIN WITH A RECEPTION PART OF A FRAME STRUCTURE APPLIED BY LEAST ONE SECOND NODE OPERATING AT LEAST PARTIALLY UNDER THE SAME TRANSMISSION/RECEPTION PATTERN AS THE FIRST NODE

302 CAUSING SPECIFIC SIGNALING TO THE AT LEAST ONE SECOND NODE IN THE EXTENDED TRANSMISSION PART

FIG 4

400 APPLYING, BY A SECOND NODE, A FRAME STRUCTURE COMPRISING AN EXTENDED RECEPTION PART, WHEREIN THE EXTENDED RECEPTION PART AT LEAST PARTIALLY OVERLAPS IN TIME DOMAIN WITH A TRANSMISSION PART OF A FRAME STRUCTURE APPLIED BY AT LEAST ONE FIRST NODE OPERATING AT LEAST PARTIALLY UNDER THE SAME TRANSMISSION/RECEPTION PATTERN AS THE SECOND NODE

402 CAUSING RECEPTION OF A SPECIFIC SIGNALING FROM THE AT LEAST ONE FIRST NODE IN THE EXTENDED RECEPTION PART

SIGNALING IN TDD COMMUNICATION

This application is a national stage entry of PCT Application No. PCT/EP2012/068400, filed on Sept. 19, 2012 entitled "SIGNALING IN TDD COMMUNICATION", which is hereby incorporated by reference in its entirety.

FIELD

The invention relates generally to mobile communication networks. More particularly, the invention relates to cross-node signaling performed in a time division duplex (TDD) communication scheme.

BACKGROUND

Time division duplex (TDD) is one possible communication scenario between two nodes, such as a base station (BS, eNB) and a user terminal (UT, UE). As a half-duplex technology, while one node transmits, the connected node receives, and vice versa.

BRIEF DESCRIPTION OF THE INVENTION

According to an aspect of the invention, there are provided methods.

According to an aspect of the invention, there are provided apparatuses.

According to an aspect of the invention, there is provided a computer program product.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims.

In an embodiment, a first node operating under a time division duplex communication scheme, applies a frame structure comprising an extended transmission part, wherein the extended transmission part at least partially overlaps in time domain with a reception part of a frame structure applied by at least one second node operating at least partially under the same transmission/reception pattern as the first node, and cause specific signaling to the at least one second node in the extended transmission part.

In an embodiment, a second node operating under a time division duplex communication scheme applies a frame structure comprising an extended reception part, wherein the extended reception part at least partially overlaps in time domain with a transmission part of a frame structure applied by at least one first node operating at least partially under the same transmission/reception pattern as the second node, and causes reception of a specific signaling from the at least one first node in the extended reception part.

In an embodiment, the overlapping transmission part of the frame structure applied by the at least one first node is a default transmission part or an extended transmission part.

In an embodiment, the second node may apply the frame structure comprising the extended reception part according to a predefined frequency for certain frames, and apply a default TDD frame structure for other frames.

In an embodiment, the second node may provide information of the frame structure applied by the second node to the first node, wherein the information indicates at least one of the following: a length of the frame, transmission-reception switching points in time domain, the number of RX parts, the number of TX parts, length of a guard period, whether or not the frame structure comprises the extended RX part, length of the default/extended RX part, number of the one or more extended RX parts.

In an embodiment, the second node may provide information indicating the frame structure to be applied to the first node.

In an embodiment, the extended reception part is located in the frame structure adjacent to a guard period, thus facilitating switching between transmission and reception.

Some embodiments of the invention are defined in the dependent claims.

LIST OF DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

A duplex communication system is a point-to-point system composed of two connected nodes or devices that can communicate with one another in both directions. One specific type of duplex communication is a half-duplex system which provides communication in both directions, but only one direction at a time (not simultaneously, as in full duplex). For two-way data-links, the time allocations for communication in such a half-duplex system may be strictly predefined and controlled. For example, a time division duplex (TDD) is a type of half duplex communication scheme in which the uplink (UL) is separated from the downlink (DL) by the allocation of different time slots in the same frequency band. In other words, UE and eNB are not allowed to transmit and receive at the same time.

Let us, as a non-limiting scenario, consider in the following a framed half-duplex TDD based wireless backhaul relay network with a multi-hop communication topology optimized for a local area. However, the use of wired backhaul (e.g. a dedicated fiber) is not excluded. Unlike wide area cellular systems, the local area systems may utilize a local-access-only frequency band including classical operator deployment and shared spectrum use, the license-exempt spectrum or white spaces to take advantage of the additional available bandwidth. As a further possible advantage, the local area system may offer an efficient device-to-device (D2D) operation mode to establish ad-hoc networks. D2D operation is not discussed here in detail as the possibility to apply such D2D communication between two nodes in a wireless communication network is well-known to a person skilled in the art.

Figure 1:
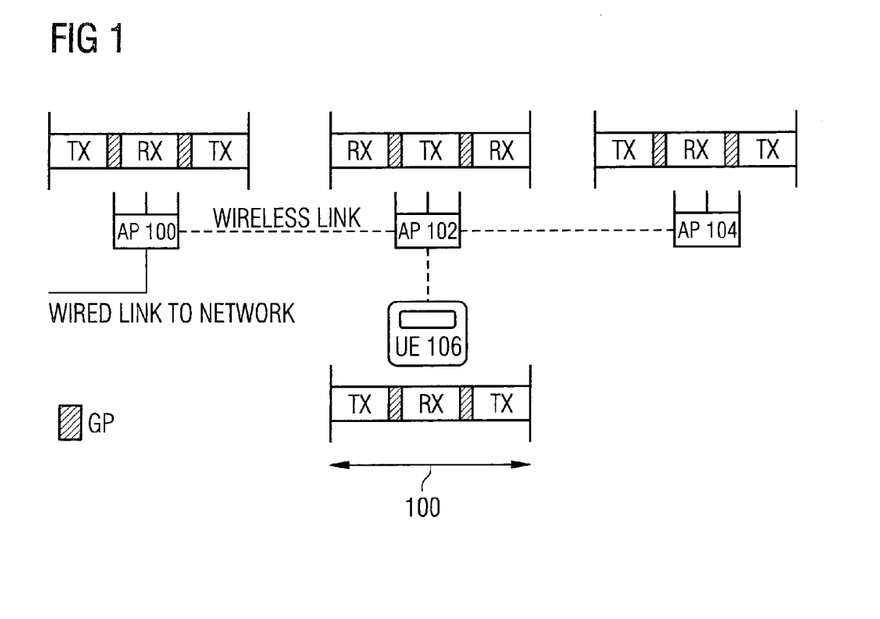
FIG. 1 presents a multi-hop TDD based communication scenario.

FIG. 1, shows an example scenario of such a framed TDD based wireless backhaul relay network with a multi-hop communication topology. The functionality depicted in FIG. 1 can be called also as self-backhauling. As shown, there is at least one master node that is connected to a wired link (i.e. access point (AP) 100 in this example case) and other nodes connected to this master node via the wireless backhaul links (i.e. AP 102 with single hop and AP 104 with multi-hop). Let us for the sake of simplicity assume that these nodes are access points (APs). However, the "slave" APs 102 and 104 may be fixed relays (inband) or even mobile devices functioning as APs. UEs (mobile devices) 106 may then be connected to at least one of the APs 100 to 104 in the system. In the example embodiment of FIG. 1, the UE 106 is connected to the AP 102 as shown with a dashed line between them.

As further shown in FIG. 1, in the TDD system with half-duplex technology, the network nodes communicating with each other via the wireless links must have "opposite" frame structures, i.e. the neighboring connected devices/nodes are sending (TX) and receiving (RX) in turns. For example, when the AP 100 is transmitting, the neighboring AP 102 is receiving, and vice versa. Similarly, when the AP 102 is transmitting, the neighboring nodes (AP 100, AP 104 and UE 106) are receiving. The presence of such strict TX/RX switching times may be very important so that each of the nodes 100 to 106 are reliably able to listen and to receive data from the neighboring node(s) in turns.

However, the strict switching times may cause problems. Let us consider for example a transmission of a reference signal (RS) in such a half-duplex TDD system with multi-hop topology. The reference signal may be used in the downlink by broadcasting the RS so that the UEs in the proximity may hear the RS and derive the best available eNB/AP to connect to. Thus, in order to provide sufficient support for mobility, each AP 100 to 104 in the system may broadcast somewhere during its TX time a certain reference signal that may be heard and measured by the UEs 106 in the system. Such RS information is then used to make decisions when to switch the serving AP 100, 102 or 104 from the current one to one with better channel conditions, for example. The problem in the scenario as presented in FIG. 1 is now that according to the TDD frame structure model of FIG. 1, the UE 106 is able to hear only the RSs which are sent during the UE 106 is in the "RX" mode, i.e. when it is listening the channel. Consequently, for example, the UE 106 in FIG. 1 is not able to hear the RSs sent by the AP 100 or the AP 104 because they are sent during a time when the UE 106 is not in the "RX" mode. However, the reception of such RS signal measurements may be important because they are used not only for the initial access but also for handover scenarios. For example, LTE handover is based on the UE 106 measuring neighboring cells and reporting the measurement results to its home cell.

The same problem is valid also for UL direction. For example, there may be similar reference signal transmissions in the UL direction (e.g. the UE 106 sends the RS so that the APs 100 to 104 may listen and measure the UL RS). This type of RS is called as sounding reference signal in LTE terminology. Likewise, the problem described above is also valid in device-to-device (D2D) scenarios, where network nodes having the same TX/RX pattern are not able to hear one another. This problem may be a restricting factor, for example, in a D2D resource allocation signaling based on radio resource reservation requests and acknowledgements.

In order to at least partially solve the above mentioned problem, it is proposed to modify the existing TDD frame structure and include a support for inter-node (a.k.a. cross-node) reference and control signaling among the network nodes following the same Tx/Rx pattern so that the signals may be listened by all UEs 106 in the network from all the APs 100 to 104 in the network substantially at the same time. The cross-node signals may then be used for example in determining the path loss and/or the need for communication among the neighboring nodes having the same TX/RX pattern in use (e.g. between UE 106 and AP 104 in FIG. 1).

Figure 2A:
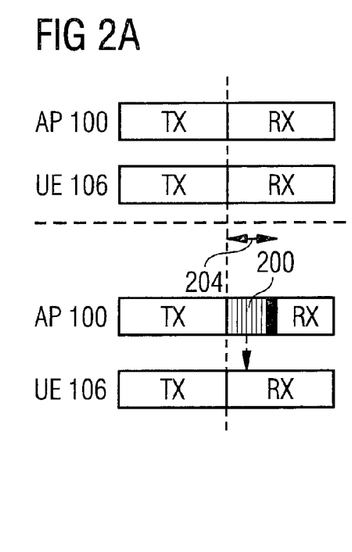
FIGS. 2A to 2D show the use of an extended transmission part and/or an extended reception part according to some embodiments.
Figure 3:
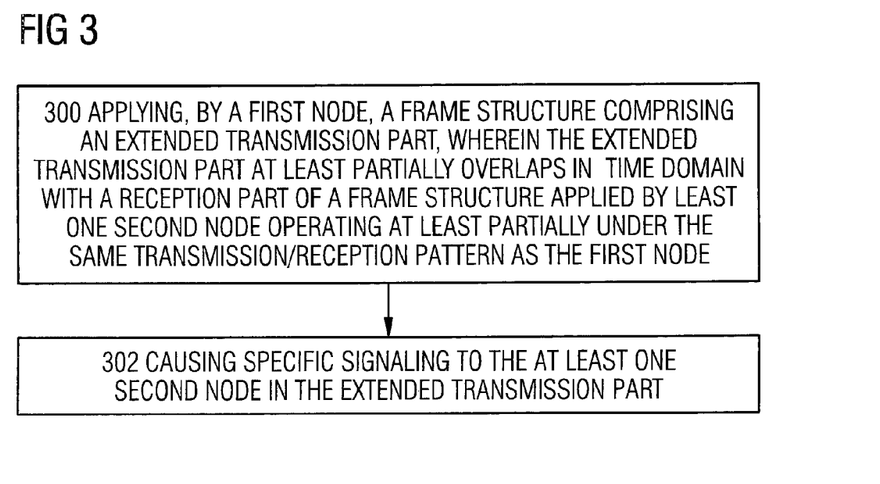
FIGS. 3 and 4 show methods according to some embodiments.

Therefore, it is proposed, as shown in FIGS. 2A and 3, that a first node, let us say the AP 100 as a non-limiting example, operating under the TDD communication scheme, applies, in step 300, a frame structure comprising an extended transmission (TX) part 200 (marked with vertical lines). The extended TX part 200 may be adjacent to the default TX part (marked with TX in Figures). The thick black lines in the Figures represent a TX/RX or RX/TX switch via a guard period (which is not explicitly shown in FIG. 2A). From the figures it may be detected that the extended TX part 200 may at least partially overlap in time domain with a reception (RX) part of a frame structure applied by at least one second node operating at least partially under the same TX/RX pattern as the first node 100. The overlapping RX part may be the default RX part or an extended RX part 202 (as illustrated later). The at least one second node may be, for example, the UE 106, as assumed in FIGS. 2A to 2D.

Thus, even though the UE 106 applies at least partially the same default TX/RX pattern as the AP 100, the first node (AP 100) may advantageously transmit information (as shown with a dotted arrow in FIG. 2A) also to the UE 106 during the time period 204 because the UE 106 has a RX part valid at those time periods. It may be noted that the frame structures of the UE 106 and the AP 100 need not follow the same TX/RX pattern throughout the whole frame. However, the frame structure applied by the UE 106 may follow the same TX/RX pattern as the AP 100 with respect to the parts of the frames where the specific signaling is to be transmitted to the UE 106. It may be that only certain parts of the frame, such as the protected parts of the frames, follow the same TX/RX pattern and this is the place where the specific signaling may need to be communicated. The rest of the frame may or may not follow the same TX/RX pattern. In step 302, the first node (e.g. the AP 100) may cause specific signaling to the at least one second node (e.g. the UE 106) in the extended TX part 200.

In the prior art, transmission of data directly to another node having the same TDD TX/RX pattern would not be possible because the switch from the TX to the RX (and vice versa) is strictly synchronized and controlled in the TDD communication scheme. This means that the switch from TX to RX occurs simultaneously (via the guard pattern) at the two TDD nodes (AP 100 and UE 106) having the same TX/RX pattern. Therefore, there is no common data communication time window between the AP 100 and the UE 106, as shown in FIGS. 2A to 2D above the dashed line.

Figure 2B:
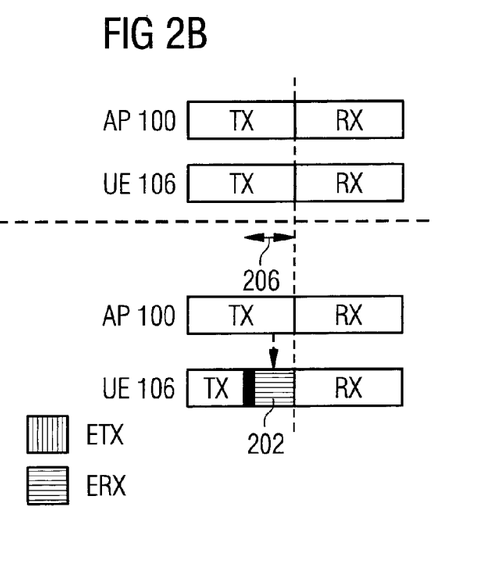
Figure 4:
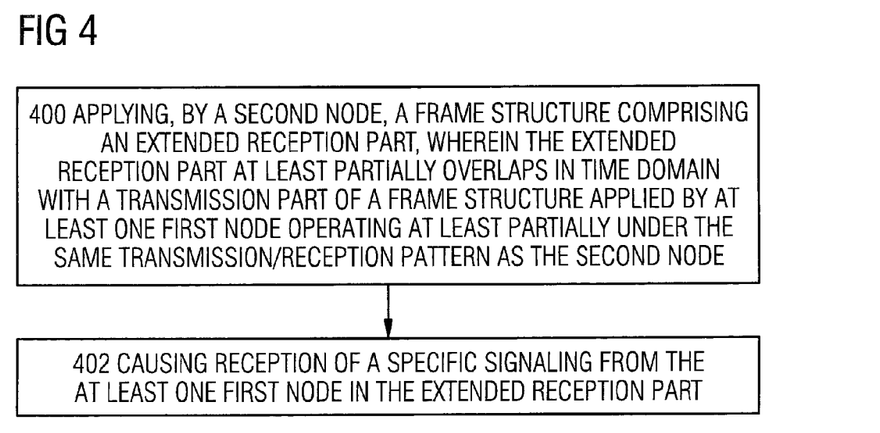

It may further be seen from FIG. 1, for example, that the UE 106 is connected to the AP 102 (as shown with the dashed line). In other words, the UE 106 may not have a direct TDD communication connection established with the AP 100. Also, as the multi-hop scenario may require that neighboring nodes have opposite TX/RX patterns, this may mean that the AP 100 and the UE 106 may apply originally the same default TX/RX pattern in their TDD communication because they are two hops away from each other. An alternative or an additional solution may be to extend the default RX part of the second node 106, as illustrated in FIGS. 2B and 4. In other words, the second node 106 operating under the TDD communication scheme may, in step 400, apply a frame structure comprising an extended RX part 202 (marked with horizontal lines). The extended RX part 202 may be adjacent to a default RX part (marked with RX in Figures). The extended RX part 202 at least partially overlaps in time domain with the TX part of a frame structure applied by at least one first node (such as the AP 100 and/or AP 104) operating at least partially under the same TX/RX pattern as the UE 106. The overlapping TX part may be the default TX part or the extended TX part 200. Then, in step 402, the second node 106 may receive a specific signaling from the first node in the extended RX part 202, as shown with a dotted arrow in FIG. 2B during the time period 206.

Figure 2C:
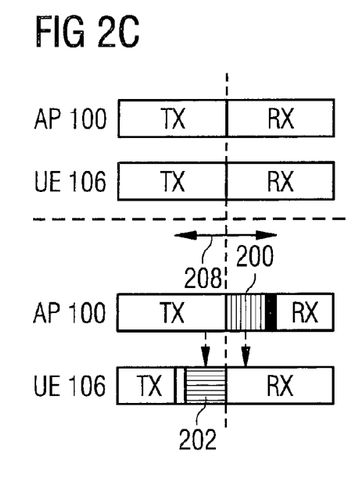

Further, as shown in FIG. 2C, both the extended TX part 200 and the extended RX part 202 may be used for the communication of data from the first node 100 to the second node 106. This embodiment allows for a longer time period 208 for the communication of the specific signaling to the second node 106, as shown with dotted arrows in FIG. 2C. This embodiment may be advantageous for example in transmitting several types of data (such as the RS, control signaling, synchronization signaling, etc.) to the second node 106 as the time window may be longer than in the embodiments of FIGS. 2A and 2B.

In an embodiment, a possible location for the specific signaling (such as the broadcast of RS) is in relation of either one or both of TX-RX and RX-TX switching points of a frame in order to minimize the guard period (GP) overhead. Thus, at least one of an extended TX part 200 and an extended RX part 202 is located/placed in the frame next to the GP in order to facilitate switching between TX and RX phases. It should be noted that in case the first node is for example an access point or a base station and the second node is a user terminal, the switch point from TX to RX may also be referred to as the switching point from DL to UL, and vice versa. Thus, the proposed solution may comprise a predetermined DL and/or UL specific signal positions in the TDD frame. In this manner, the embodiments take into account the properties of the framed access of the TDD communication scheme and the applied frame structure.

Figure 2D:
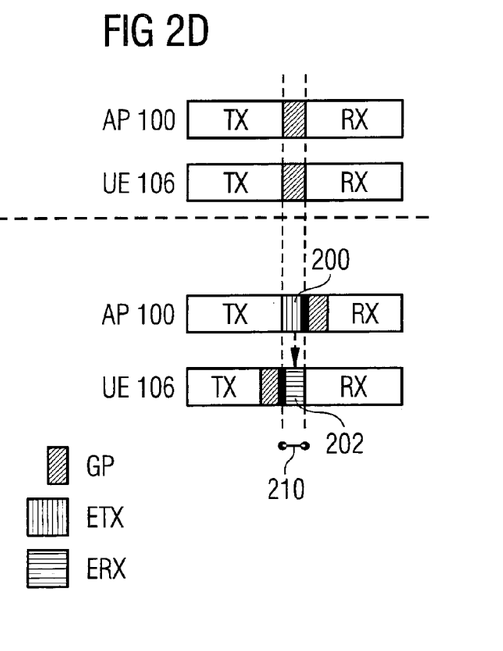

However, as may have been noted, FIGS. 2A to 2C do not, for simplicity reasons, depict the guard periods (GPs) between the TX/RX parts. However for the sake of completeness, FIG. 2D shows such GPs with blocks having diagonal lines. For example, it needs to be taken care that attached eNBs/APs do not send to each other on the backhaul links during the GP period of either one of the eNBs/APs. This may be guaranteed by including the GP as a part of cross-node specific signaling structure.

From FIG. 2D it may be further detected that the extended RX part 202 of the frame structure applied by the UE 106 may in an embodiment at least partially overlap in time domain with the extended TX part 200 of the frame structure applied by the AP 100, and vice versa. Thus, the specific signaling represented with a dotted arrow in FIG. 2D may be performed during the overlap of the extended RX part 202 and the extended TX part 200 (e.g. during the time window 210). In case the extended TX part 200 had been longer, the specific signaling could be performed alternatively without applying any extended RX part 202. Alternatively, in case the extended RX part 202 had been selected to be longer, the specific signaling could be performed without applying any extended TX part 200.

Compared to the default TDD frame structure of two network devices following the same TX/RX pattern as shown above the horizontal dashed line in FIGS. 2A to 2D, a common signaling position is advantageously arranged to the frame structures by extending the TX part of the node sending the signaling (such as the AP 100 in this example) and/or extending the RX part of a node receiving the signaling (such as the UE 106 in this example).

The extended TX/RX position may be introduced at the end/beginning of either the default TX or the default RX period, depending on the phase of Tx/Rx cycle the given node operates. This may advantageously cause the TX part and the RX part (either the default TX/RX part or the extended TX/RX part 200/202) to overlap and thus form a field or time window which may be used for the specific signaling between these network nodes following the same TX/RX patterns. As a result, the specific signaling location is in relation of DL-UL or UL-DL (or both) switching point(s) of the TDD frame. In an embodiment, the extended TX and/or RX part(s) locate in the protected part of the flexible TDD frame in order for it not to restrict the TX/RX flexibility of the frame. Thus, the embodiments do not exclude the possibility to maintain the UL-DL ratio flexibility of the underlying TDD frame structure.

Figure 5:
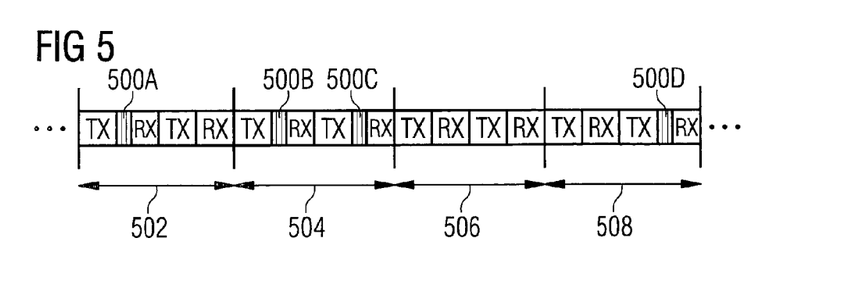
FIG. 5 illustrates how the frequency of the frame structure comprising the extended transmission or reception part may be set, according to an embodiment.

In an embodiment, the frequency of the specific signaling (such as how many signaling positions there is in a frame and the frequency of frames containing such signaling position) may be predefined/configured on a network level. As a consequence, the nodes 100 and 106 may apply the frame structure comprising the extended TX/RX part 200/202 according to a predefined frequency for certain frames and apply the default TDD frame structure for the other frames. In this manner, the embodiments may be dynamically reconfigured by the network according to prevailing needs. This is shown in FIG. 5 where four consecutive frames are shown from the point of view of the AP 100, however, similar representation could be performed from the point of view of the UE 106 with extended RX parts being present (in case of DL signaling). In the first frame 502, there is one extended TX part 500A applied for transmission of data to the second node(s). In the second frame 504, there are two extended TX parts 500B and 500C applied. In the third frame 506, there are no extended TX parts but the default TX and RX parts are applied for the default TDD frame 506. In the fourth frame 508, there is one extended TX part 500D applied.

As can be seen from FIG. 5, the position of the extended TX/RX part may be altered from frame to frame. This information may be acquired from the network or acquired otherwise. The frequency of applying the frame structure comprising the one or more extended TX/RX parts may be configured by the network so that the extended TX/RX part will be applied regularly. Alternatively the network may dynamically command the nodes to apply the frame structure with the extended TX/RX part when needed. Also there may be one or more extended TX/RX parts 200/202 in the frame. It should be noted that FIG. 5 depicts only an example non-limiting TDD communication scheme.

Figure 6A:
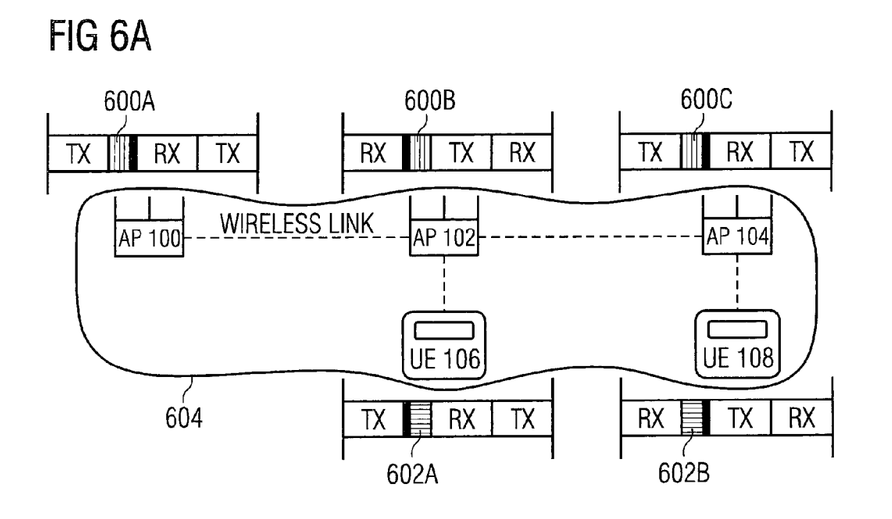
FIGS. 6A and 6B present a signaling position common to a whole network according to an embodiment.
Figure 6B:
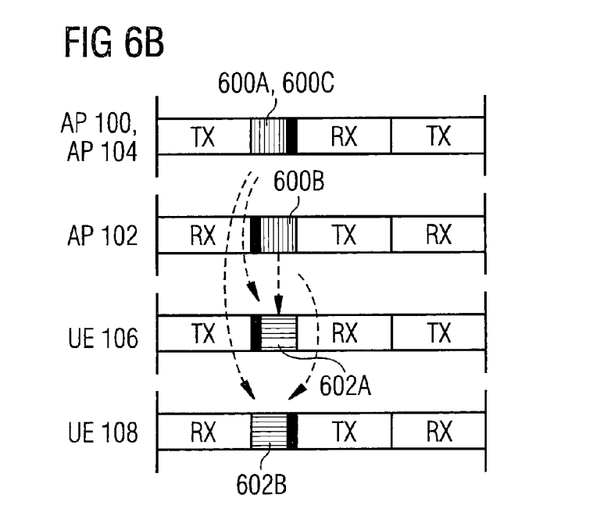

In an embodiment, the specific signaling position is common for the whole network (including all the cells of the specific network). An example related to this embodiment is presented in FIGS. 6A and 6B. Let us further assume that the specific signaling comprises the broadcast of the RS in the downlink as a non-limiting example. In this network-specific case, it is required that at some point all the eNBs/APs 100 to 104 in the network are in the TX mode and all the UEs 106 to 108 in the network are in the RX mode independently of the TX/RX patterns of the underlying TDD frame structure. Thus, in an embodiment, the first node 100, 102, or 104 may cause specific signaling in the extended TX part 600A, 600B, 600C, respectively, to a plurality of second nodes 106 to 108 each associated with a certain network 604. This may be possible as the extended TX parts 600A, 600B, 600C at least partially overlap in time domain with the RX part of the frame structures applied by the plurality of second nodes 106 to 108, as shown in FIG. 6B. It should be noted that the overlapping RX part may be either the default RX part or the extended RX part 602A, 602B (as is the case in FIG. 6). In other words, even though the example of FIG. 6 applies both the extended TX and RX parts, only one of them may be sufficient, as illustrated with reference to FIGS. 2A and 2B. As a result, all UEs 106 to 108 in the network 604 may be able to hear the RS signals shown with dotted arrows in FIG. 6B from the different eNB/APs 100 to 104 substantially at the same time. It may further be noted that for example the AP 102 may send the RS signal to the UE 106 also during the default TX part. However, a simultaneous transmission from all network nodes to all UEs in the network may provide improved reliability for the decision to perform a handover.

The node 100 to 108 may be understood to be associated with the certain network 604 when the node belongs to the infrastructure of the network 604 or the node is connected to one of the nodes of the network 604. A single network 604 may naturally comprise a plurality of cells. Although FIG. 6 depicts the downlink scenario for transmitting the RS, similar approach may be used for the network-specific UL reference signaling (e.g. the sounding signaling) or UL resource requests. For such a case it may be required that at some point all the eNBs/APs 100 to 104 in the network are in the RX mode while all the UEs 106 to 108 in the network are in the TX mode.

In addition to the RS signal position common for the whole network as described with reference to FIGS. 6A and 6B, cell-specific, UE-specific, or UE group-specific signaling positions may be determined in the TDD frames on top of the original/default frame structure. Accordingly, in an embodiment, the first node (such as the node 100) may cause specific signaling in the extended Tx part to at least one of the following: a plurality of second nodes each associated with a certain cell (i.e. cell-specific signaling), a specific second node (i.e. a node-specific signaling), a specific group of second nodes, wherein the extended Tx part at least partially overlaps in time domain with the RX part of the frame structures applied by the corresponding at least one second node (e.g. the UE 106) receiving the signaling. Similar approach may be taken from the point of views of the UE 106, in which case the extended Rx part of the UE 106 at least partially overlaps with the TX part of at least one of the following: a plurality of first nodes each associated with a certain cell, a specific first node a specific group of first nodes.

Figure 7A:
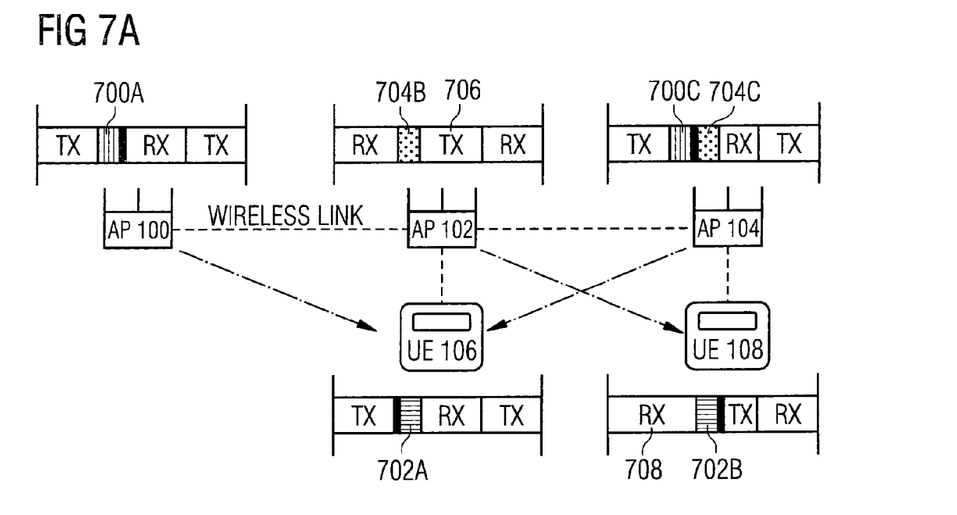
FIGS. 7A and 7B depict a specific signaling position according to an embodiment.
Figure 7B:
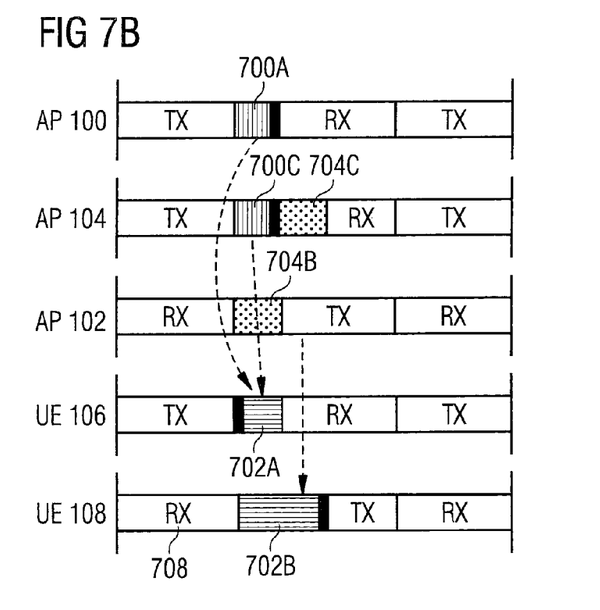

An example of such case is presented in FIGS. 7A and 7B. In this embodiment, the TX part 706 in the serving cell 102 may comprise a gap 704B related to the neighboring cell(s). I.e. during the gap 704B, the neighboring APs 100, 104 may transmit the signals to the UE 106 served by the cell 102, as shown with the dotted arrows in FIGS. 7A and 7B. Further, the cell/UE-specific signaling is in this embodiment located in the extended TX parts 700A, 700C and in the default TX part 706 of the corresponding frame structure. I.e. the AP 102 need not necessarily apply any extended TX part for transmitting the specific signaling. This may be because the UE 108, to which the AP 102 is configured to transmit the specific signals, may apply the extended RX part 702B. Alternatively, the AP 102 could use an extended TX part to transmit the RS to the UE 108 during the default RX part 708 of the frame structure applied by the UE 108. The frame structure of the AP 104 also comprises a 704C gap in order to allow the AP 102 to transmit the specific signaling to the UE 108 served by the AP 104.

The UE 106, 108, for which the specific signaling (such as the RS) is targeted to, may extend their RX part as shown with reference numerals 702A and 702B. As the UE 106, 108 is in the RX mode, the UE 106, 108 may not send anything during this time to the serving AP 102, 104, respectively, as illustrated with the dotted blocks 704B, 704C. This "non-used part of a frame with the attached UE" may be advantageously used by the corresponding AP 102, 104 to perform other functions, such as radio resource management. Although the UE-specific signaling may suffer from cross-link interference, it should be noted that if there were other UEs (connected to the APs 100 to 104) that are not configured to listen to the RS signals from their neighboring APs, their frame structures or interaction with the serving AP would not be affected by the RS fields targeted to other UEs. This embodiment may allow more dynamic and flexible configuration of specific signaling as not each node of the network is set as the target.

As said, the position and frequency of the signaling may be configured in a cell- or a UE-specific manner. For example, the cell/UE-specific signaling position and frequency may be known by the UE 106, the AP 102 connected to the UE 106 and the APs 100, 104 sending the UE specific RS.

An embodiment provides coordination of the specific signaling (RS, control signals, synchronization signals, etc.) position between neighboring cells. This coordination may indicate for example the position/timing of the specific signaling and resources used to transmit/receive the signaling. In one embodiment, the first node (such as the AP 100) may acquire information of the frame structure applied by the at least one second node (such as another AP 102, 014 and/or the UEs 1606, 108). The information may indicate at least one of the following: a length of the frame, transmission-reception switching point(s) in time domain, the number of RX parts, the number of TX parts, length of a guard period, whether or not the frame structure comprises the extended RX part, length of the default/extended RX part, number of the extended RX parts. The first node 100 may thereafter determine the frame structure to be applied on the basis of the information. The first node 100 may receive such information via an X2 signaling, via the backhauls links, for example. Similarly, the second node may acquire such information of the frame structure applied by the first node and then the second node may derive the to-be-applied frame structure. One decision the first node or the second node may make on the basis of the acquired information is that is any extended TX part or any extended RX part needed in the frame or not. For example, if the other node already applies an extended TX part, the second node may not need to use a frame structure with an extended RX part.

In another embodiment, the first node 100 may receive information indicating the frame structure to be applied from a network or from at least one second node 102 to 108. This embodiment provides low complexity as the first node 100 need not determine the frame structure itself but acquires it directly from the network or from another node. The eNBs may apply, for example, the X2 interface for exchanging such information, the relays may use the wireless backhaul channels, and the UE may receive the data via control signaling, broadcast of data or via an initial attach process, for example.

Figure 8:
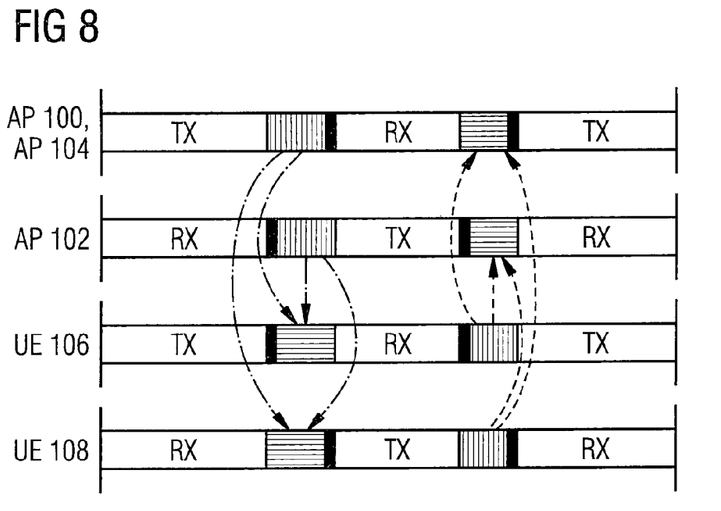
FIG. 8 illustrates uplink signaling according to an embodiment.

It should be noted that although some of the embodiments are described by referring to the half-duplex TDD based wireless backhaul relay network with the multi-hop communication topology (as depicted in FIGS. 1, 6A and 7A), the proposed solution is similarly applicable also for UL signaling wherein the first node may be a user terminal and the second node may be a base station. This is illustrated in FIG. 8 with an example where in addition to DL signaling there is also an UL signaling field in a frame. Otherwise the underlying scenario may be the same as in FIG. 6B. In this example, all APs 100 to 104 in the network may listen to UL sounding signals or UL resource requests (or any other UL signaling such) from all of the UEs 106, 108 substantially simultaneously independently of the underlying TX/RX TDD pattern of the APs 100 to 104. The transmitted UL signals are shown with the dashed arrows in FIG. 8. As is the case with DL specific signaling, the UL signaling frequency and position may be configured. In addition, the position and frequency of the extended RX/TX parts of the UL related signaling may alternatively be determined to be cell-, node group or node-specific.

Also in an embodiment, D2D/mesh communication scenarios may advantageously apply the proposed scheme. In such D2D case, the first node and the second node are both user terminals, for example. Such D2D use case may advantageously guarantee that all UEs that are part of the D2D network are able to communicate with each other. The communication may include capability to receive discovery/resource request signals from all UEs without complicated allocation of Tx/Rx patterns.

In yet another embodiment, the first node and the second node may both be relay stations, access point or base stations, for example. In general, each node may comprise, be, or be comprised in a base station, a relay station, an access point or a user terminal.

Similarly, although the reference signals are used in some examples for describing the invention, the embodiments may as well be applied for a signaling of any information, such as control signals. In other words, the signaling may be extended to cover also or additionally other information. Let us look at this option more closely.

In an embodiment, the specific signaling comprises a number of hops and/or quality of the links indicating the estimated latency in a multi-hop wireless backhaul from the serving eNB/AP 102, 104 to the master eNB/AP 100. Therefore, the specific signaling may be used by the UE 106, 108 for determining the route with best channel conditions and smallest latency when considering not only the link between UE and serving eNB/AP (such as the link from the AP 102 to the UE 106) but also the rest of the backhaul links (shown with dashed lines in FIGS. 1, 6A and 7A) in a multi-hop wireless backhaul scenario.

In an embodiment, the specific signaling comprises information whether or not the eNB/AP 100 to 104 may be connected by any UE 106, 108 and/or whether or not there are some restrictions, such as specific subscriber and/or UE groups (for example different operators).

In an embodiment, the specific signaling comprises other information about the capability of eNB/AP 100 to 104 and the related backhaul link to serve the UE 106, 108.

In an embodiment, the specific signaling comprises synchronization signals, such as a primary and/or secondary synchronization signals (PSS/SSS). The synchronization signals may allow initiating a UE-originated cell change (e.g. a hand-over).

In an embodiment, the specific signaling comprises system information (including e.g. information on the available random access resources). The specific signaling may carry also system information corresponding to the neighboring cell.

In an embodiment, the specific signaling comprises a radio resource allocation signaling, reservation requests and acknowledgements, such as a ready-to-send (RTS) and/or a clear-to-send (CTS) type of resource allocation signaling.

In an embodiment, the specific signaling may comprise a reference signal sequence used for the channel estimation of the link between the UE and the eNB/AP sending or receiving the RS/sounding signal. The reference signal may thus be a DL reference signal or an UL reference signal (e.g. a sounding signal). The RS signals may advantageously be used by the UEs for measurements with respect to both the serving cell and neighboring cell(s) substantially simultaneously.

In an embodiment, the specific signaling comprises device-to-device signaling between two D2D capable devices.

In an embodiment, the specific signaling may comprise transmission of inter-cell orthogonal signals. This may advantageously reduce the total signaling overhead. For example, in case the specific signaling relates to the DL reference signals broadcasted from the APs 100 to 104, the design of the reference signal may advantageously be so that the same signal may be used in measurements related to both own and the neighboring cells. Thus, in an embodiment, the reference signal is an inter-cell orthogonal reference signal. The reference signal may carry information indicating the channel quality information of the channel between the transmitting AP and the receiving UE. The use of such inter-cell RS may maintain the total RS overhead at a reasonable level. In another embodiment, the reference signal is a node-specific reference signal targeted for a specific node (such as UE) only which may allow for more flexibility in the design of the network.

Figure 9:
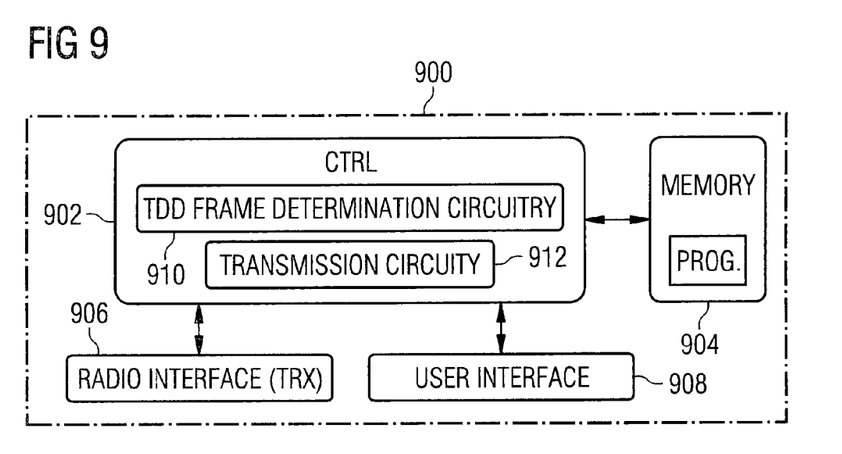
FIGS. 9 and 10 show apparatuses according to some embodiments.
Figure 10:
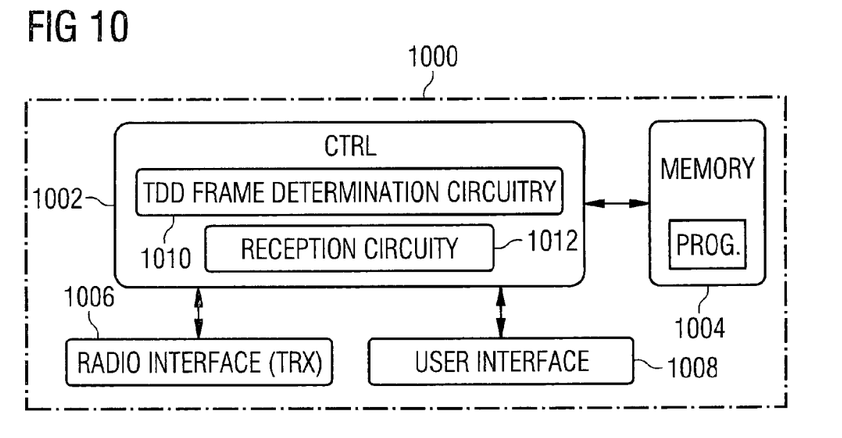

FIGS. 9 and 10 provide apparatuses 900 and 1000 comprising a control circuitry (CTRL) 902, 1002, such as at least one processor, and at least one memory 904, 1004 including a computer program code (PROG), wherein the at least one memory and the computer program code (PROG), are configured, with the at least one processor, to cause the respective apparatus 900, 1000 to carry out any one of the embodiments described. It should be noted that FIGS. 9 and 10 show only the elements and functional entities required for understanding a processing systems of the apparatuses. Other components have been omitted for reasons of simplicity. It is apparent to a person skilled in the art that the apparatuses may also comprise other functions and structures.

Each of the apparatuses 900, 1000 may, as said, comprise a control circuitry 902, 1002, respectively, e.g. a chip, a processor, a micro controller, or a combination of such circuitries causing the respective apparatus to perform any of the embodiments of the invention. Each control circuitry may be implemented with a separate digital signal processor provided with suitable software embedded on a computer readable medium, or with a separate logic circuit, such as an application specific integrated circuit (ASIC). Each of the control circuitries may comprise an interface, such as computer port, for providing communication capabilities. The respective memory 904, 1004 may store software (PROG) executable by the corresponding at least one control circuitry The apparatuses 900, 1000 may further comprise radio interface components (TRX) 906, 1006 providing the apparatus with radio communication capabilities with the radio access network. The radio interface components may comprise standard well-known components such as amplifier, filter, frequency-converter, (de)modulator, and encoder/decoder circuitries and one or more antennas.

The apparatuses 900, 1000 may also comprise user interfaces 908, 1008 comprising, for example, at least one keypad, a microphone, a touch display, a display, a speaker, etc. Each user interface may be used to control the respective apparatus by the user.

As said, the apparatuses 900, 1000 may comprise the memories 904, 1004 connected to the respective control circuitry 902, 1002. However, memory may also be integrated to the respective control circuitry and, thus, no memory may be required. The memory may be implemented using any suitable data storage technology, such as semiconductor based memory devices, flash memory, magnetic memory devices and systems, optical memory devices and systems, fixed memory and removable memory.

In an embodiment, the apparatus 900, 1000 may comprise the terminal device of a cellular communication system, e.g. a computer (PC), a laptop, a tabloid computer, a cellular phone, a communicator, a smart phone, a palm computer, or any other communication apparatus. Alternatively, the apparatus 900, 1000 is comprised in such a terminal device. Further, the apparatus 900, 1000 may be or comprise a module (to be attached to the apparatus) providing connectivity, such as a plug-in unit, an "USB dongle", or any other kind of unit. The unit may be installed either inside the apparatus or attached to the apparatus with a connector or even wirelessly. In an embodiment, the apparatus 900, 1000 may be, comprise or be comprised in an AP, such as a wireless local area network access point or a pico area network access point. In an embodiment, the apparatus 900, 1000 may be, comprise or be comprised in a base station or a relay station.

In an embodiment, the apparatus 900 may be the first node, i.e. the node transmitting the specific signaling (such as the AP 100, as used in the description of some of the embodiments). The control circuitry 902 may comprise a TDD frame determination circuitry 910 for acquiring knowledge of the TDD frame which is to be applied. The circuitry 910 may determine, for example, whether the frame is to comprise an extended TX period or not. A transmission circuitry 912 may be for transmitting the specific signaling to the target second node(s) during the extended TX part, for example.

In an embodiment, the apparatus 1000 may be the second node, i.e. the node receiving the specific signaling (such as the UE 106, as used in the description of some of the embodiments). The control circuitry 1002 may comprise a TDD frame determination circuitry 1010 for acquiring knowledge of the TDD frame which is to be applied. The circuitry 1010 may determine, for example, whether the frame is to comprise the extended RX period or not. The circuitry 1002 may also comprise a reception circuitry 1012 for receiving the specific signaling during the extended RX part from the first node(s), for example.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:
    applying, by a first node operating under a time division duplex communication scheme, a frame structure comprising an extended transmission part, wherein the extended transmission part at least partially overlaps in time domain with a reception part of a frame structure applied by a plurality of second nodes operating at least partially under the same transmission/reception pattern as the first node, wherein each second node is associated with a certain network; and
    causing specific signaling in the extended transmission part to the plurality of second nodes, wherein the extended transmission part at least partially overlaps in time domain with the reception part of the frame structure applied by the plurality of second nodes.

2. The method of claim 1, wherein the overlapping reception part of the frame structure applied by the at least one second node is a default reception part or an extended reception part.

3. The method of claim 1, wherein the first node and the at least one second node do not have a direct time division duplex communication connection established between each other.

4. The method of claim 1, further comprising:
    applying the frame structure comprising the extended transmission part according to a predefined frequency for certain frames; and
    applying a default time division duplex (TDD) frame structure for other frames.

5. The method of claim 1, wherein the frame structure applied by the first node further comprises a gap during which other nodes may transmit the specific signaling to a node served by the first node.

6. The method of claim 1, wherein the extended transmission part is located in the frame structure adjacent to a guard period, thus facilitating switching between transmission and reception.

7. An apparatus, comprising:
    at least one processor and at least one memory including a computer program code, wherein the at least one memory and the computer program code are configured, with the at least one processor, to cause the apparatus at least to:
    apply, in a time division duplex communication scheme, a frame structure comprising an extended transmission part, wherein the extended transmission part at least partially overlaps in time domain with a reception part of a frame structure applied by a plurality of second nodes operating at least partially under the same transmission/reception pattern as the apparatus, wherein each second node is associated with a certain network; and
    cause specific signaling in the extended transmission part to the plurality of second nodes, wherein the extended transmission part at least partially overlaps in time domain with the reception part of the frame structure applied by the plurality of second nodes.

8. The apparatus of claim 7, wherein the overlapping reception part of the frame structure applied by the at least one second node is a default reception part or an extended reception part.

9. The apparatus of claim 7, wherein the apparatus and the at least one second node do not have a direct time division duplex communication connection established between each other.

10. The apparatus claim 7, wherein the at least one memory and the computer program code are further configured, with the at least one processor, to cause the apparatus to:
    apply the frame structure comprising the extended transmission part according to a predefined frequency for certain frames; and
    apply a default time division duplex (TDD) frame structure for other frames.

11. The apparatus of any of claim 7, wherein the at least one memory and the computer program code are further configured, with the at least one processor, to cause the apparatus to:
    cause specific signaling in the extended transmission part to at least one of the following: a plurality of second nodes each associated with a certain cell, a specific second node and a specific group of second nodes, wherein the extended transmission part at least partially overlaps in time domain with the reception part of the frame structures applied by the corresponding at least one second node receiving the signaling.

12. The apparatus of claim 7, wherein the at least one memory and the computer program code are further configured, with the at least one processor, to cause the apparatus to:
    acquire information of the frame structure applied by the at least one second node, wherein the information indicates at least one of the following: a length of the frame, a transmission-reception switching points in time domain, a number of reception parts, a number of extended transmission parts, a length of a guard period, a length of the reception part; and
    determine the frame structure to be applied on the basis of the information.

13. The apparatus of claim 7, wherein the at least one memory and the computer program code are further configured, with the at least one processor, to cause the apparatus to:
    cause reception of information indicating the frame structure to be applied from a network or from at least one second node.

14. The apparatus of claim 7, wherein the specific signaling comprises communication of at least one of the following: a broadcast of a reference signal, a broadcast of a sounding signal, control signaling, a synchronization signal, resource allocation signaling, acknowledgement, to-be-applied transmission-reception pattern, number of hops in a multi-hop scenario, system information, device-to-device signaling.

15. The apparatus of claim 14, wherein the reference signal is a node-specific reference signal.

16. The apparatus of claim 7, wherein the frame structure applied by the apparatus further comprises a gap during which other nodes may transmit the specific signaling to a node served by the apparatus.

17. The apparatus of any of claim 7, wherein the extended transmission part is located in the frame structure adjacent to a guard period, thus facilitating switching between transmission and reception.

18. An apparatus, comprising:
at least one processor and at least one memory including a computer program code, wherein the at least one memory and the computer program code are configured, with the at least one processor, to cause the apparatus at least to:
apply, in a time division duplex communication scheme, a frame structure comprising an extended reception part, wherein the extended reception part at least partially overlaps in time domain with a transmission part of a frame structure applied by a plurality of first nodes operating at least partially under the same transmission/reception pattern as the apparatus, wherein each first node is associated with a certain network; and
cause reception of specific signaling in the extended reception part from the plurality of first nodes, wherein the extended reception part at least partially overlaps in time domain with the transmission part of the frame structure applied by the plurality of first nodes.

* * * * *

UNITED STATES PATENT AND TRADEMARK OFFICE
CERTIFICATE OF CORRECTION

Page 1 of 1

PATENT NO. : 9,628,252 B2
APPLICATION NO. : 14/427923
DATED : April 18, 2017
INVENTOR(S) : Lahetkangas et al.

It is certified that error appears in the above-identified patent and that said Letters Patent is hereby corrected as shown below:

On the Title Page

On Page 2, Column 2, Item (56), under "OTHER PUBLICATIONS", Line 20, delete "Magazin;" and insert -- Magazine; --, therefor.

On Page 2, Column 2, Item (56), under "OTHER PUBLICATIONS", Line 21, delete "ISSn" and insert -- ISSN --, therefor.

In the Claims

In Column 14, Line 15, Claim 10, delete "apparatus claim" and insert -- apparatus of claim --, therefor.

In Column 14, Line 24, Claim 11, delete "apparatus of any of" and insert -- apparatus of --, therefor.

In Column 15, Line 3, Claim 17, delete "apparatus of any of" and insert -- apparatus of --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*